A. H. SNYDER & R. L. BUCK.
STORAGE BATTERY.
APPLICATION FILED JULY 22, 1914.
1,177,547.
Patented Mar. 28, 1916.
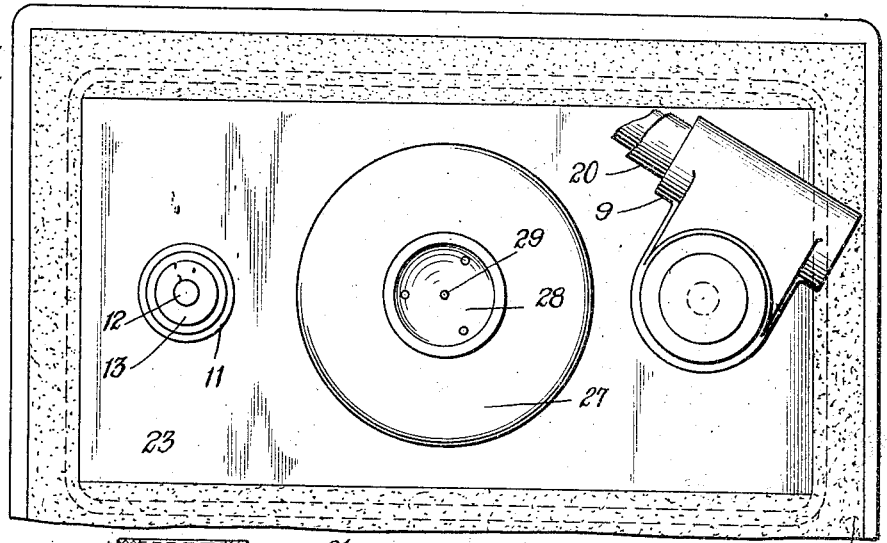
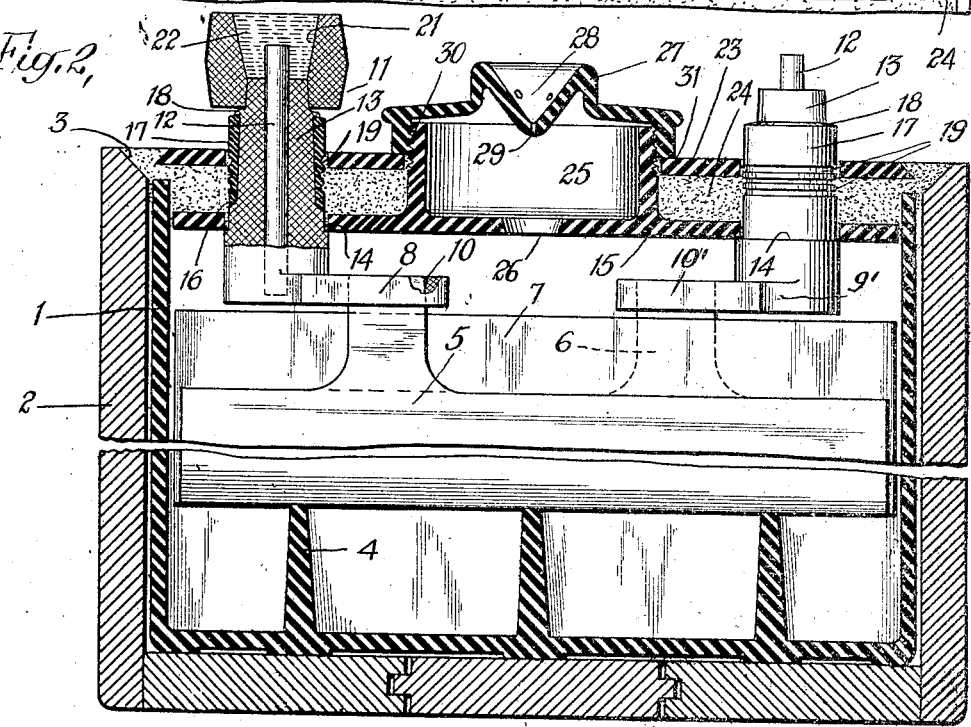
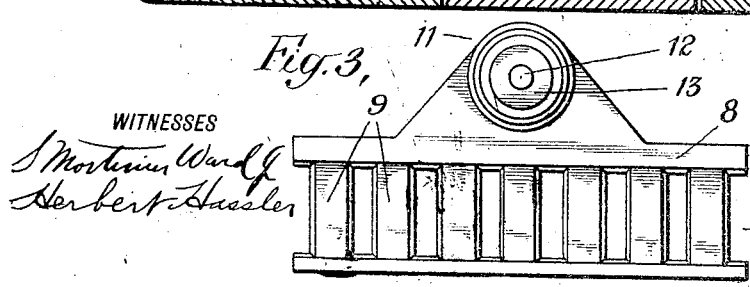
WITNESSES
S. Mortimer Ward
Herbert Hassler
INVENTORS
Almond H. Snyder
Ralph L. Buck,
BY Kenyon & Kenyon
their ATTORNEYS.

UNITED STATES PATENT OFFICE.

ALMOND H. SNYDER, OF LANCASTER, AND RALPH L. BUCK, OF BUFFALO, NEW YORK, ASSIGNORS TO GOULD STORAGE BATTERY COMPANY, A CORPORATION OF NEW YORK.

STORAGE BATTERY.

1,177,547.  Specification of Letters Patent.  Patented Mar. 28, 1916.

Application filed July 22, 1914. Serial No. 852,374.

*To all whom it may concern:*

Be it known that we, ALMOND H. SNYDER and RALPH L. BUCK, both citizens of the United States, and residents, respectively, of Lancaster, Erie county, New York, and Buffalo, Erie county, New York, have invented certain new and useful Improvements in Storage Batteries, of which the following is a specification.

Our invention relates to storage batteries, ing and ventilation of storage battery, sealing and ventilation of storage battery jars.

One of the objects of our invention is to provide durable and efficient means whereby the battery jar may be reliably sealed, while providing for the ventilation of the jar through the cover.

The invention contemplates the sealing of the cover around the edges of the jar, and the sealing of the terminals where they project through the cover so as to prevent leakage of the corrosive fluid from the jar at either of these places, and it further contemplates a simple and efficient means of ventilation through the cover without danger of leakage of the corrosive liquid to the outside of the cover.

Our invention will be more readily understood and further objects and advantages of the invention will more fully appear from the following description taken in connection with the accompanying drawings showing the preferred embodiment of our invention and forming a part of this specification, and in which—

Figure 1 is a plan view of an end portion of a casing containing a battery jar; Fig. 2 is an elevation of the same in section, with certain parts broken away; and Fig. 3 shows a detail.

Referring to the drawings, 1 is the battery jar, in this instance made of hard rubber, placed within an outer wooden casing 2 which is preferably beveled at its upper inner edge as shown at 3. Vertical ridges 4 projecting up from the bottom of the jar support the respective positive and negative plates 5 and 6 which are spaced apart by spacing strips 7. The positive plates 5 are connected to a position bus bar 8 by means of connection strips or leads 9 the tops of which are soldered to the bus bars as shown at 10. Likewise, the negative plates 6 are connected to the negative bus bar 10' by means of the leads 9'

The positive bus bar is provided with a terminal 11 preferably consisting of an inner copper rod or strip 12 incased in or surrounded by a thick coating 13 of some suitable non-corrodible metal such as lead, or a suitable lead compound. The terminal is preferably provided at its base with a shoulder 14 for supporting a cover-piece 15 hereinafter mentioned, and above this shoulder the terminal is tapered upwardly and at the lower end of the tapered portion, is provided with a second shoulder 16. The tapering portion of the terminal is provided with a sleeve 17 of some suitable hard material that will withstand the action of the acid, such, for example, as hard rubber or acid-proof fiber, which fits tightly thereon, and at its lower end rests against the shoulder 16. In order to provide a good tight joint between the upper end of the sleeve and the terminal to prevent capillary attraction of the liquid between the two, the soft metal of the terminal at this point is spun down over the upper edge of the sleeve to form a tight overlapping joint, as shown at 18. The outer surface of the sleeve is provided with one or more grooves 19 for a purpose hereinafter referred to.

In the embodiment of the invention shown, the inner copper rod 12 projects above the soft metal coating 13, and connection to the terminal is made by means of a suitable connection piece 20 which fits on the upper end of the soft metal coating and is made hollow to provide a chamber 21 in which a suitable soldering compound 22 is poured to make good electrical contact with the terminal. The negative terminal is constructed in all respects similar to the positive terminal just described.

The cover for the jar comprises the main or lower cover-piece 15 above mentioned, and a top cover-piece 23 with a suitable sealing compound 24, such as any well-known asphaltum compound, interposed between the two. In the present embodiment of the invention, the lower cover-piece rests upon the shoulders 14 of the terminals and fits within the walls of the jar below the edge thereof, while the upper cover-piece 23 is supported by the cementing compound above the edge of the jar and extends over the same. The sealing compound fills in the space between the upper cover-piece and the edge of the jar, and also the space between the upper cover-piece and the beveled edge of the outer casing so as to seal the edges of the cover to the jar and to form a seal between the jar and its casing. The sealing compound also forms a tight joint with the grooves in the hard rubber sleeves above referred to, to prevent any leakage along the outside of the sleeve through the cover.

In order to ventilate the battery jar, a suitable ventilating structure is provided for the composite cover, and in the preferred embodiment of our invention as herein shown, this consists of a catch basin 25 preferably formed integral with the lower cover-piece. By forming the basin integral with the cover-piece the great difficulty of leakage of the acid at this point is obviated, and furthermore the cover is strengthened by the vertical walls of the basin rather than weakened, as would be the case if the basin were made detachable and threaded into the cover at this point. This is especially an advantage where the storage batteries as in the form shown are of small size made especially for automobiles and even smaller motor-driven vehicles, since the tapping in of the relatively large expansion chamber at this point would considerably weaken the construction of the cover. The walls of the basin extend upwardly above the level of the lower cover-piece and through an opening in the upper cover-piece. The basin serves as an expansion chamber for the electrolyte and gases and is provided at its bottom with a ventilating opening 26 and is closed at its top preferably by a ventilating cap 27 having a catch basin 28 formed in the top thereof, preferably V-shaped in section and provided with one or more ventilating openings 29. The ventilating cap in the form of the invention shown, is detachably secured to the walls of the basin 25 by suitable threads 30. It is desirable that means should be provided for holding the top cover-piece in place firmly upon the sealing compound, and in the present form of the invention, this is accomplished by having the lower edge of the flange 31 of the ventilating cap engage the top cover-piece, so that when the cap is screwed down upon the basin 25 the top cover-piece is firmly pressed into position on the sealing compound.

The method of attaching the leads from the battery plates to the bus bars will be seen by an examination of Fig. 3, which is a plan view of a terminal and bus bar. The bus bar is in the form of a slotted strip of metal preferably molded to the terminal, and the leads are inserted in the slots and lead-burned or soldered therein in the well-known manner.

While we have described our invention in detail in connection with the embodiment thereof shown in the drawings, it will be obvious to those skilled in the art that various changes and modifications therein may be made, and we do not wish to be understood as limiting ourselves to the particular embodiment of the invention shown, and we aim, in the appended claims, to cover all modifications within the scope of our invention.

Having thus described our invention, what we claim as new and desire to secure by Letter Patent, is—

1. In a storage battery, the combination of a battery jar having a plurality of battery plates therein, a cover for the jar having an integral catch basin formed therein with a ventilating opening to the jar, and a detachable ventilating cap for the top of the basin.

2. In a storage battery, the combination of a battery jar having a plurality of battery plates therein, a cover for the jar having an integral catch basin formed therein serving as an expansion chamber and having a ventilating opening to the jar, and a detachable ventilating cap for the top of the basin in turn having a catch basin formed at its ventilating portion.

3. In a storage battery, the combination of a battery jar having a plurality of battery plates therein, a composite cover for the jar comprising a main cover-piece fitting within the walls of the jar below the edge thereof, said cover-piece having an integral catch basin the walls of which extend above the surface of the cover-piece, with an auxiliary cover-piece above the said main cover-piece and above the edges of the jar and provided with an opening through which the walls of the basin project, with a sealing compound interposed between the two cover-pieces and extending over the rim of the jar for sealing the jar, and a detachable ventilating cap for the basin of the first cover-piece.

4. In a storage battery, the combination of a jar having a plurality of battery plates therein, a composite cover for the jar comprising a cover-piece below the edge of the jar having a catch basin serving as an expansion chamber the walls of which extend above the surface of said cover-piece, an auxiliary cover-piece above the first cover-piece and above the edge of the jar and extending over the same and having an opening through which the walls of the basin project, with a sealing compound between the two cover-pieces serving to seal the jar between said cover-pieces, and a detachable ventilating cap covering the basin.

5. In a storage battery, the combination of a jar having a plurality of battery plates therein, a composite cover for the jar comprising a cover-piece below the edge of the jar having a catch basin the walls of which extend above the surface of said cover-piece, an auxiliary cover-piece above the first cover-piece and above the edge of the jar and extending over the same and having an opening through which the walls of the basin project, with a sealing compound between the two cover-pieces serving to seal the jar between said cover-pieces, and means on the projecting walls of the basin of the first cover-piece serving to hold the top cover-piece in place.

6. In a storage battery, the combination of a jar having a plurality of battery plates therein, a plurality of superposed cover-pieces, the lower one fitting within the walls of the jar below the edge thereof, one of said cover-pieces having a catch basin integral with one of the cover-pieces and also serving as a ventilating passage and the other cover-piece having an opening registering therewith through which the walls of the basin project, a sealing compound interposed between said cover-pieces to seal the jar, and means for securing said cover-pieces one to the other.

7. In a storage battery, the combination of a jar having a plurality of battery plates therein, a plurality of superposed cover-pieces, the lower one fitting within the walls of the jar below the edge thereof, one of said cover-pieces having an integral catch basin also serving as a ventilating passage and the other cover-piece having an opening registering therewith through which the walls of the basin project, a sealing compound interposed between said cover-pieces to seal the jar, and means on the projecting walls of the basin serving to secure one cover-piece to the other.

8. In a storage battery, the combination of a jar having a plurality of battery plates therein, a plurality of superposed cover-pieces, the lower one fitting within the walls of the jar below the edge thereof, the upper cover-piece being located above the edge of the jar and extending over the same, one of said cover-pieces having a catch basin also serving as a ventilating passage and the other cover-piece having an opening registering therewith through which the walls of the basin project, a sealing compound interposed between said cover-pieces and extending between the bottom surface of the top cover-piece and the edge of the jar to seal the jar, and means for securing said cover-pieces one to the other.

9. In a storage battery, the combination of a jar having a plurality of battery plates therein, a casing for the battery jar, a plurality of superposed cover-pieces, the lower one fitting within the walls of the jar below the edge thereof, the upper cover-piece being located above the edge of the jar and extending over the same, one of said cover-pieces having a catch basin also serving as a ventilating passage and the other cover-piece having an opening registering therewith through which the walls of the basin project, a sealing compound interposed between said cover-piece and extending between the bottom surface of the top cover-piece and the edge of the jar and between the said top cover-piece and the casing for the jar, to seal the jar and the space between the jar and the casing, and means for securing said cover-pieces one to the other.

10. In a storage battery, the combination of a jar having a plurality of negative and positive battery plates therein, terminals extending upwardly from the battery plates and provided with supporting shoulders adjacent their base, a plurality of superposed cover-pieces having alined openings through which the terminals project, the lower cover-piece fitting within the walls of the jar below the edges thereof and supported by said shoulders on the terminals, one of said cover-pieces having a catch basin also serving as a ventilating passage and the other cover-piece having an opening registering therewith through which the walls of the basin project, a sealing compound interposed between said cover-pieces, serving to seal the cover to the jar and to seal the openings around the terminals, and means for securing said cover-pieces one to the other.

11. In a storage battery, the combination of a jar having a plurality of negative and positive battery plates therein, terminals secured to said plates and extending upwardly therefrom, a cover for the jar having openings through which the terminals project, each terminal having a soft non-corrodible metal surface and tapering at the portion projecting through the cover, a hard rubber sleeve fitting the tapering portion of each terminal, the soft metal of each terminal being spun over on its sleeve to form a tight overlapping joint therewith to prevent the flow of fluid from the jar, and a sealing compound around the sleeve and terminal.

12. In a storage battery, the combination of a jar having a plurality of negative and positive battery plates therein, terminals secured to said plates and extending upwardly therefrom, a cover for the jar having openings through which the terminals project, said terminals having soft non-corrodible metal surfaces and provided each with a shoulder near the lower end thereof from whence the terminals taper upwardly, sleeves of hard acid-proof material tightly fitting the tapering portions of the terminals and resting upon the shoulders, the soft metal of the terminals at the upper ends of the sleeves being spun over on the sleeves to prevent displacement of the same and to form a tight overlapping joint therewith so as to prevent the creeping of the fluid between the sleeve and the terminal.

13. In a storage battery, the combination of a jar having a plurality of negative and positive battery plates therein, terminals secured to said plates and extending upwardly therefrom, a cover for the jar having openings through which the terminals project, each terminal having a soft non-corrodible metal surface and a tapering portion where the terminal projects through the cover and provided with a shoulder at the lower end of the tapering portion, a sleeve of hard acid-proof material fitting the tapering portion of each terminal and resting upon the shoulder, the metal of each terminal being spun over the top of the sleeve to form a tight overlapping joint to prevent the flow of fluid from the jar, and a sealing compound around the sleeve and terminal.

14. In a storage battery, the combination of a jar having a plurality of negative and positive battery plates therein, terminals extending upwardly therefrom, said terminals having soft non-corrodible metal surfaces with a tapering portion, a plurality of superposed cover-pieces having alined openings through which the terminals project, the lower cover-piece fitting below the edge of the jar, sleeves of hard acid-proof material fitting the tapering portions of the terminals, the soft metal of the terminals being spun over the top of the sleeves to form a tight overlapping joint therewith, a sealing compound between the two cover-pieces and surrounding the sleeves and terminals and serving to seal the cover on the jar and to seal the openings around the terminals, and a ventilating passage through the cover-pieces.

15. In a storage battery, the combination of a jar having a plurality of negative and positive battery plates therein, terminals extending upwardly therefrom, said terminals having soft non-corrodible metal surfaces with a tapering portion, a plurality of superposed cover-pieces having alined openings through which the terminals project, the lower cover-piece fitting below the edge of the jar and the upper cover-piece being located above the edge of the jar, sleeves of hard acid-proof material fitting the tapering portions of the terminals between the two cover-pieces, the soft metal of the terminals being spun over the top of the sleeves to form a tight overlapping joint therewith, a sealing compound between the two cover-pieces and surrounding the sleeves and terminals and serving to seal the cover on the jar and to seal the openings around the terminals, a catch basin for the lower cover-piece having walls extending upwardly through the sealing compound and above the upper cover-piece, and means on the projecting wall of the basin serving to hold the upper cover-piece in position on the sealing compound.

16. In a storage battery, the combination of a jar having a plurality of negative and positive battery plates therein, terminals extending upwardly therefrom, said terminals having soft non-corrodible metal surfaces with a tapering portion, a plurality of superposed cover-pieces having alined openings through which the terminals project, sleeves of hard acid-proof material fitting the tapering portions of the terminals to form a tight joint therewith, and a sealing compound between the two cover-pieces and surrounding the sleeves and terminals and serving to seal the cover on the jar and to seal the openings around the terminals.

17. In a storage battery, the combination of a jar having a plurality of negative and positive battery plates therein, terminals extending upwardly therefrom, said terminals having soft non-corrodible metal surfaces with a tapering portion, a plurality of superposed cover-pieces having alined openings through which the terminals project, sleeves of hard acid-proof material fitting the tapering portions of the terminals to form a tight joint therewith, a sealing compound between the two cover-pieces and surrounding the sleeves and terminals and serving to seal the cover on the jar and to seal the openings around the terminals, and means for securing the two cover-pieces together.

18. In a storage battery, the combination of a battery jar having a plurality of battery plates therein, a composite cover for the jar comprising a main cover-piece fitting within the walls of the jar below the edge thereof, said cover-piece having a catch basin the walls of which extend above the surface of the cover-piece, with an auxiliary cover-piece above said main cover-piece and above the edges of the jar and provided with an opening therethrough, a detachable part secured to the catch basin and extending above said opening in the auxiliary cover-piece and engaging said auxiliary cover-piece to secure the same to the main cover-piece, said part in turn having a ventilating opening therethrough, and a sealing compound interposed between the two cover-pieces for sealing the jar.

In testimony whereof, we have signed our names to this specification, in the presence of two subscribing witnesses.

ALMOND H. SNYDER.
RALPH L. BUCK.

Witnesses:
P. W. ENGLISH,
JOS. MURPHY.